United States Patent [19]

Miles et al.

[11] 4,260,667

[45] Apr. 7, 1981

[54] THERMAL BATTERY CELLS UTILIZING MOLTEN NITRATES AS THE ELECTROLYTE AND OXIDIZER

[75] Inventors: Melvin H. Miles; Aaron N. Fletcher, both of Ridgecrest, Calif.

[73] Assignee: The United States of America as represented by the Secretary of the Navy, Washington, D.C.

[21] Appl. No.: 110,076

[22] Filed: Jan. 7, 1980

[51] Int. Cl.$^3$ ............................................... H01M 6/36
[52] U.S. Cl. ..................... 429/112; 429/199
[58] Field of Search ............... 429/112, 101, 103, 199

[56] References Cited

U.S. PATENT DOCUMENTS

| | | | |
|---|---|---|---|
| 3,055,960 | 9/1962 | Yalom et al. | 429/112 |
| 3,117,032 | 1/1964 | Panzer | 429/112 |
| 3,201,278 | 8/1965 | Kurtzweil et al. | 429/112 |
| 3,258,365 | 6/1966 | Klopp et al. | 429/112 |
| 3,508,968 | 4/1970 | Orshinsky | 429/11 |
| 3,726,718 | 4/1973 | Mellors et al. | 429/112 |
| 3,884,784 | 5/1975 | Wurm et al. | 204/129.75 |
| 4,041,217 | 8/1977 | Collins | 429/112 |
| 4,068,045 | 1/1978 | Abrams | 429/112 |
| 4,086,396 | 4/1978 | Mathers et al. | 429/112 X |
| 4,190,704 | 2/1980 | Miles et al. | 429/112 X |
| 4,200,686 | 4/1980 | Fletcher | 429/112 |

*Primary Examiner*—Anthony Skapars
*Attorney, Agent, or Firm*—R. S. Sciascia; W. Thom Skeer; Lloyd E. K. Pohl

[57] ABSTRACT

A thermal battery cell is provided comprising a low-melting point electrolyte in the presence of halides, a cathode, an oxidizer and a calcium anode.

3 Claims, No Drawings

THERMAL BATTERY CELLS UTILIZING MOLTEN NITRATES AS THE ELECTROLYTE AND OXIDIZER

BACKGROUND OF THE INVENTION

1. Field of the Invention

The present invention pertains to thermal battery cells. More particularly, it pertains to such cells wherein activation is brought about at a much lower temperature and the electrolyte is also used as the oxidizer.

2. DESCRIPTION OF THE PRIOR ART

Thermal battery cells contain an electrolyte that is solid and non-conductive at normal temperatures but becomes ionically conductive when a built-in pyrotechnic heat source activates the battery by melting the solid electrolyte. Such characteristics make thermal batteries capable of essentially unlimited storage life and of rapid and reliable activation. Thus, such batteries can be designed to withstand severe shock and vibrations and are ideally suited for use in military, aerospace, and emergency applications.

Generally, such thermal batteries utilized in missile systems are activated at temperatures above 352° C. and make use of a LiCl—KCl mixture as the electrolyte, calcium metal as the anode, and $CaCrO_4$ as the cathodic material. In such a system, a complex series of chemical and electrochemical reactions occur at the anode to form a liquid calcium-lithium alloy, a $KCl-CaCl_2$ double salt (M.P. 752° C.) and a $Ca_2CrO_4Cl$ layer adjacent to the anode. Due to these complex interactions, thermal batteries using LiCl—KCl mixtures are generally designed to operate at internal temperatures between 475° C. and 550° C.

SUMMARY OF THE INVENTION

The present invention solves the above problems by using nitrate salts which allows lower activation temperatures because of their lower melting points and said salts are also the cell cathodic material, namely the cell electrolyte and the cell oxidizer. More specifically the thermal battery cell of this invention comprises a low melting point electrolyte in the presence of halides, a cathode, an oxidizer and a calcium anode wherein the electrolyte and cathode material (oxidizer) are nitrate salts.

OBJECTS OF THE INVENTION

An object of the invention is the use of nitrate salts as a lower melting electrolyte which shortens a thermal battery cell's activation time and reduces the weight of heat sources and insulation.

Another object of the invention is that the nitrate also functions as the cathode material or oxidizer, thus simplifying battery construction by eliminating the necessity for the addition of a separate oxidizer.

A further object of the invention is to utilize nitrate salts which are low hazard materials, rather than previous oxidizers, such as calcium chromate, which is a recognized health hazard and has been designated a carcinogen and is confirmed a carcinogen in recent official reports. Other objects, advantages, and novel features of the present invention will become apparent from the following detailed description of the invention.

The following examples additionally illustrate examples of carrying out the invention.

EXAMPLES

Single cell discharge experiments are conducted in a stainless steel test chamber under a helium-filled inert atmosphere. The top portion of the test chamber consists primarily of a Swagelock T-joint connected through a reducer to an inner steel tube and provides also for connection to a vacuum/helium line. Face pressure on the electrochemical cell is maintained by the compression of a stainless steel spring. Using the force constant for the spring (1240 k $s^{-2}$), the calculated face (axial) pressure is about $4.3 \times 10^5$ Pa (4.2 atm).

The electrochemical cells are fabricated from calcium discs 1.25 mm thick and 6.35 mm in diameter, spot-welded to a Ca/Fe bi-metallic disc of the same diameter but only 0.3 mm in thickness. The aluminum lead wire is spot-welded to the Fe side of the bi-metal. Two fibreglass filter paper discs (Gelman, type A, 0.3 mm thickness) containing the electrolyte are fused to the mechanically cleaned calcium surface by using a spot heater lamp. The back side and edges of the bi-metallic disc are masked off by applying a thin layer of Sauereisen type cement (no. 1) and then drying by use of a heat gun after the soapstone spacers are in place. After connecting the top and bottom portions of the test chamber, the aluminium lead wire emerging from the top is sealed with wax.

The test chamber containing the assembled cell is then connected to the vacuum/helium line and re-filled with helium several times before finally evacuating several hours to about $10^{-7}$ atm to remove any moisture. Prior to activation, the test chamber is re-filled with helium to give a gas pressure of 1 atm at room temperature.

The electrochemical cell is activated by suddenly immersing the bottom portion of the test chamber into a fluidized sand bath maintained at the desired experimental temperature. The bath temperature is measured with a digital thermocouple thermometer (Fluke, Model 2165A) as well as with a dial thermometer and is controlled to within +3° C. during an experimental run. Cell discharge is initiated when the cell voltage had stabilized 2–3 min after activation. Constant current discharge is maintained by a Keithley current source (Model 225).

During cell activation and discharge, the cell voltage, cell resistance, and the gas pressure in the test chamber are continually recorded using a strip chart recorder and digital recorder. The cell resistance is measured by the use of a Hewlett-Packard milliohmmeter (Model 4328A) that gives accurate readings even when in contact with a d.c. circuit. The gas pressure in the test chamber is monitored by the use of a transducer (Pace, Model CD25).

In order to measure the polarization occurring at the anode and cathode separately, similar single cell tests are conducted using an open nickel lid placed on a hot plate [13]. A metal rod is used with a spring and soapstone spacers to maintain face pressure on the cell. An L-shaped reference electrode containing 0.1 M $AgNO_3$ in equimolar $KNO_3$—$NaNO_3$ is used to monitor the potential of the cathode. The PAR instrument is used for potential measurements versus the reference electrode while the Keithley instrument again provided the constant current.

The electrochemical cells, on the average, contains about 65 mg of calcium, 25 mg of the electrolyte salt and 4 mg of the fibreglass filter paper. Based upon electrochemical equivalents, the calcium is present in excess. After each experiment, the amount of calcium remaining is determined by reacting it with water and measuring the volume of hydrogen gas evolved.

Single cell tests are made using various salt mixtures containing LiNO$_3$ and added halides. The best results are obtained using a 50-25-25 mole percent (mol%) mixture of LiNO$_3$—LiCl—KCl. This mixture is actually prepared as the equivalent formulation of LiNO$_3$—LiCl—KNO$_3$ (25-50-25 mol%, m.p.=160° C.). This system is operable over a temperature range of 250°–450° C. to produce 2.5–2.8 V at open-circuit and initial operating voltages above 2 V at 10 mA cm$^{-2}$. Activated lifetimes to 75% of the peak discharge voltages are 45, 26, 21, 10 and 9 min at temperatures of 250°, 300°, 350°, 400°, and 450° C., respectively. This cell could also be activated at lower temperatures, but cell performance is poor (1.2 V at 2 mA cm$^{-2}$ at 175° C.).

At operating temperature below 400° C., the Ca/LiNO$_3$—LiCl—KCl cell shows applications requiring a sixty-minute thermal battery. The cell lifetimes to zero voltage at 250°, 300°, and 350° C. are 57, 73, and 66 min. respectively. Cell voltages remained above 1.5 V for over 40 min in each of these tests.

Other mixtures tested containing LiNO$_3$ and added halide included 70-25-5, 55-25-20, and 50-25-25 mol% mixtures of LiNO$_3$—KNO$_3$—LiCl as well as 65-25-10 and 20-40-40 mol% mixtures of LiNO$_3$—LiCl—KCl. A 50-50 mol% mixture of LiNO$_3$—LiCl and a 40-20-20-20 mol% mixture of LiNO$_3$—LiCl—KCl—CaCrO$_4$ were also tested. Mixtures containing lower chloride content generally gave lower cell voltages, a more rapid increase in cell resistances, and shorter lifetimes than the 50-25-25 mol% mixture of LiNO$_3$—LiCl—KCl. The 20-40-40 mol% mixture of LiNO$_3$—LiCl—KCl gave good cell performance at 350° C., but its relatively high melting point (~280° C.) would limit its lower temperature range.

An electrolyte consisting of both solid and liquid phases over a wide temperature range tends to improve the performance of thermal battery cells. For example, LiNO$_3$—LiCl—KCl (50-25-25 mol%) begins to melt at about 160° C., yet undissolved crystals remain even at 360° C. Undissolved chloride salts restrict the transport of nitrate to the calcium, thus reducing the rate of direct reaction. This mixture also forms a solid solution that co-exist with the liquid and undissolved crystals over a wide temperature range.

A cell test of LiNO$_3$—LiBr—KBr (50-25-25 mol%, m.p.~200° C.) at 350° C. gave similar results to the corresponding chloride system. Upon melting, this bromide system develops a yellow coloration suggesting a reaction with nitrates to produce bromine. A preparation of LiNO$_3$—LiI—KI (50-25-25 mol%) produced, upon melting, a dark brownish-red colour and violet iodine fumes to the extent that it could not be used. An 'open-pan' cell test of LiNO$_3$—LiCl—K$_2$Cr$_2$O$_7$(50-25-25 mol% m.p.~160° C.) at 350° C. gave good cathode potentials (+0.2 V versus Ag$^+$/Ag) but the anode polarized badly even at low current densities. The rapid onset of a high cell resistance exceeding 100$\omega$ suggests the decomposition of the K$_2$Cr$_2$O$_7$ to form an insoluble, non-conducting product at the anode.

For comparison with the nitrate systems, an 'open-pan' test of calcium with LiCl—KCl—CaCrO$_4$ (47-34-19 mol%, m.p.~340° C.) is made at 425° C. This cell gave 2.61 V at open-circuit and 2.53 V, 2.41 V, and 2.21 V for 30–120 s at current densities of 10,20, and 30 mA cm$^{-2}$, respectively. At current densities above 30 mA cm$^{-2}$, the cell performance deteriorates due to serious polarization at the anode. This is due to the build-up of low mobility reaction products such as KCl.CaCl$_2$ at the anode interface [6,7]. Although it is possible that KCl—CaCl$_2$ may also form at the anode in the LiNO$_3$—LiCl—KCl systems, ideal solubility calculations indicate that much less soluble CaO would form instead. In support of this, a potassium-free mixture of LiNO$_3$—LiCl (50-50 mol%, m.p.=227° C.) performed similarly to the LiNO$_3$—LiCl—KCl mixture at 350° C.

During these experiments, it was observed that molten salt mixtures containing CaCrO$_4$ would dissolve the fibreglass disc and attack glass beakers. The LiCl—KCl—CaCrO$_4$ mixture as well as LiNO$_3$—LiCl—KCl—CaCrO$_4$ (40-20-20-20 mol%, m.p. 210° C.) showed this agressive action towards glass while LiNO$_3$—LiCl—KCr$_2$O$_7$ did not. This suggests that the following reaction

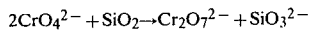

$$2CrO_4^{2-} + SiO_2 \rightarrow Cr_2O_7^{2-} + SiO_3^{2-}$$

should be considered in thermal battery cells containing both chromates and silica.

What is claimed is:

1. In a thermal battery cell comprising an electrolyte consisting of potassium, lithium, nitrate and halide ions, a cathode immersed in said electrolyte, a calcium anode immersed in said electrolyte and a heat source in thermal contact with said electrolyte for supplying thermal energy thereto, the improvement residing in utilizing an electrolyte having mole percentages of said potassium, lithium, nitrate and halide ions such that the electrolyte will begin melting at about 160° C. but still contain undissolved crystals at 360° C.

2. In a thermal battery cell according to claim 1, the further improvement residing in utilizing as said electrolyte a composition made up from 50 mole percent LiNO$_3$, 25 mole percent LiCl and 25 mole percent KCl.

3. In a thermal battery according to claim 1, the further improvement residing in utilizing as said electrolyte a composition made up from 50 mole percent LiNO$_3$, 25 mole percent LiBr and 25 mole percent KBr.

* * * * *